US010496740B1

(12) United States Patent
Gross et al.

(10) Patent No.: US 10,496,740 B1
(45) Date of Patent: Dec. 3, 2019

(54) CREATING AND HANDLING LAMBDA FUNCTIONS IN SPREADSHEET APPLICATIONS

(71) Applicant: Microsoft Technology Licensing, LLC, Redmond, WA (US)

(72) Inventors: Christopher John Gross, Seattle, WA (US); Jeffrey James Duzak, Redmond, WA (US); Andrew James Becker, Duvall, WA (US); Claudio Vittorio Russo, Girton (GB); Andrew Donald Gordon, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/024,566

(22) Filed: Jun. 29, 2018

(51) Int. Cl.
| | |
|---|---|
| *G06F 17/24* | (2006.01) |
| *G06F 8/30* | (2018.01) |
| *G06F 17/27* | (2006.01) |
| *G06F 17/17* | (2006.01) |
| *G06F 17/21* | (2006.01) |

(52) U.S. Cl.
CPC ............ *G06F 17/246* (2013.01); *G06F 8/311* (2013.01); *G06F 17/17* (2013.01); *G06F 17/211* (2013.01); *G06F 17/27* (2013.01)

(58) Field of Classification Search
CPC .................................................. G06F 17/246
See application file for complete search history.

(56) References Cited

U.S. PATENT DOCUMENTS

| | | | |
|---|---|---|---|
| 2002/0118221 A1 | 8/2002 | Hudson et al. | |
| 2004/0103366 A1* | 5/2004 | Peyton-Jones | ........ G06F 17/246 715/213 |
| 2007/0244672 A1 | 10/2007 | Kjaer | |
| 2009/0276482 A1* | 11/2009 | Rae | ...................... G06F 9/5027 709/201 |
| 2009/0319542 A1 | 12/2009 | Le brazidec et al. | |
| 2011/0289396 A1 | 11/2011 | Oh | |
| 2012/0191642 A1 | 7/2012 | George | |

(Continued)

OTHER PUBLICATIONS

"Non Final Office Action Issued in U.S. Appl. No. 16/024,598", dated Aug. 19, 2019, 20 Pages.

(Continued)

*Primary Examiner* — Asher D Kells

(57) ABSTRACT

Examples discussed herein relate to creating and handling lambdas in spreadsheet application, e.g., Microsoft Excel®. As discussed herein, lambdas are user defined functions (UDFs) that are natively creatable and maintainable through the use of a lambda registry in the spreadsheet application. In an implementation, a method of handling lambdas in a spreadsheet application is disclosed. The method includes detecting that a cell of a spreadsheet is populated with an expression that defines a lambda function and registering the lambda function with a lambda registry corresponding to the spreadsheet. The registration includes recording a home cell that identifies a location of the cell of the spreadsheet where the lambda function is defined. The method further includes replacing the expression that defines the lambda function with a reference to the registered lambda function.

20 Claims, 9 Drawing Sheets

(56) References Cited

U.S. PATENT DOCUMENTS

| | | | |
|---|---|---|---|
| 2013/0067305 A1* | 3/2013 | Golan | G06F 17/246 715/219 |
| 2013/0179764 A1* | 7/2013 | Battagin | G06F 17/246 715/209 |
| 2015/0309980 A1* | 10/2015 | Glass | G06F 9/543 715/219 |
| 2017/0228358 A1 | 8/2017 | Hirzel et al. | |
| 2018/0295194 A1 | 10/2018 | Deraz et al. | |

OTHER PUBLICATIONS

"Non Final Office Action Issued in U.S. Appl. No. 16/024,556", dated Oct. 11, 2019, 16 Pages.

\* cited by examiner

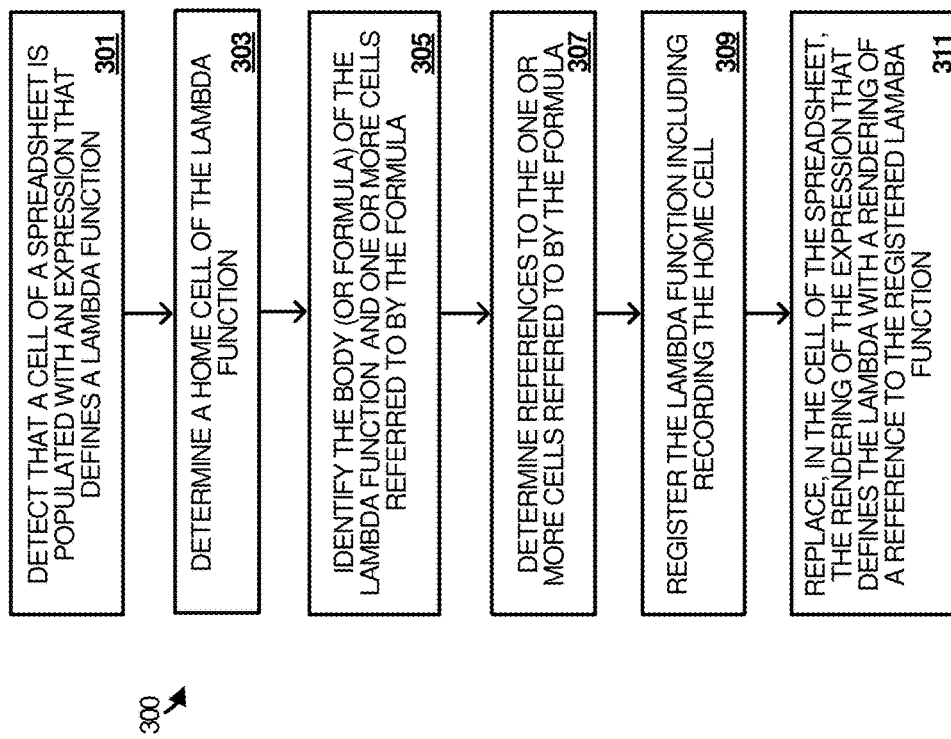

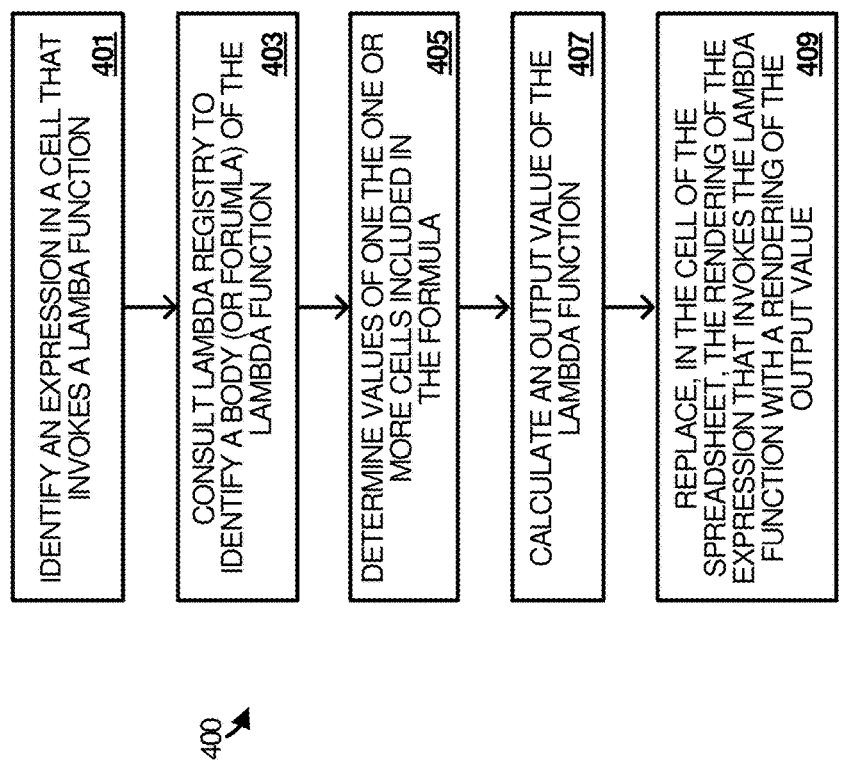

CREATING AND HANDLING LAMBDA FUNCTIONS IN SPREADSHEET APPLICATIONS

CROSS REFERENCE TO RELATED APPLICATIONS

This application is related to co-pending U.S. patent application Ser. No. 16/024,580, entitled "AUTOMATICALLY CREATING LAMBDA FUNCTIONS IN SPREADSHEET APPLICATIONS," U.S. patent application Ser. No. 16/024,598, entitled "DISTRIBUTION OF LAMBDA FUNCTIONS," and U.S. patent application Ser. No. 16/024,556, entitled "RENDERING LAMBDA FUNCTIONS IN SPREADSHEET APPLICATIONS," all of which were filed on the same day as this application, the contents of which are all expressly incorporated by reference herein.

BACKGROUND

Spreadsheet applications such as, for example, Microsoft Excel®, are widely used in many fields and are increasingly important for analyzing data in today's business and computing environments. For example, data analysts use spreadsheet applications as tools for performing spreadsheet tasks including, but not limited to, consolidating and massaging data, producing charts, performing complex calculations, and the like.

The analysis on data input into spreadsheets is often complex. For example, it is not uncommon for spreadsheets to contain hundreds or thousands of formulae. These spreadsheets often comprise purely-functional programs that lack modularity, rely on copy/paste duplication (of formulae, of whole workbooks), utilize little or no naming, and are otherwise extremely burdensome to create and maintain.

User Defined Functions (UDFs) are supported by many spreadsheet applications and generally address the problems above. Unfortunately, utilizing UDF functionality in today's spreadsheet applications can be extremely complex and time consuming as users must learn at least one programming language, e.g., Visual Basic for Applications (VBA), C++, JavaScript, etc., to code and update the UDFs. Additionally, scalability and cross-platform portability can become an issue due to the lack of native support for UDFs.

Overall, the examples herein of some prior or related systems and their associated limitations are intended to be illustrative and not exclusive. Upon reading the following, other limitations of existing or prior systems will become apparent to those of skill in the art.

BRIEF SUMMARY

Examples discussed herein relate to creating and handling lambdas in spreadsheet application, e.g., Microsoft Excel®. In an implementation, a method of handling lambdas in a spreadsheet application is disclosed. The method includes detecting that a cell of a spreadsheet is populated with an expression that defines a lambda function and registering the lambda function with a lambda registry corresponding to the spreadsheet. The registration can include recording a home cell that identifies a location of the cell of the spreadsheet where the lambda function is defined. The method further includes replacing the expression that defines the lambda function with a reference to the registered lambda function.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 3 depicts flow diagram illustrating example operations for registering a lambda function with a lambda registry of a spreadsheet application, according to some implementations.

FIG. 4 depicts flow diagram illustrating example operations for consulting a lambda registry to identify and calculate an output of a lambda function in a spreadsheet, according to some implementations.

DETAILED DESCRIPTION

Technology is disclosed herein for creating and handling lambdas (or lambda functions) in spreadsheet applications.

As discussed herein, lambdas are user (or custom) defined functions (UDFs) that are natively creatable within a cell of a spreadsheet and maintainable within a spreadsheet application using a lambda registry. The function syntax can have one or more arguments including one or more optional parameters followed by a function definition (also referred to as the function body or formula). Once defined, a lambda function can be invoked, and the formula applied like other first-class functions.

In some implementations, the spreadsheet application can detect expressions that define a lambda function, register the lambda function with the lambda registry, and replace a representation of the expression with a representation of a reference to the registered lambda function. The registration can include recording a number of fields including a home cell that identifies a location of the spreadsheet where the lambda function is defined. Other fields can include identifier (ID), Name, function body (or formula), etc. One or more lambda registries can be created and associated with workbooks (or spreadsheet files). As discussed herein, each workbook (or spreadsheet file) includes one or more sheets (or spreadsheet grids). The lambda functions can be invoked by referencing a name of the lambda function or, in some instances, the home cell of the lambda function.

Various technical effects are enabled by the techniques discussed herein. For example, the techniques enable users to more easily create and define lambdas (or lambda functions) within a spreadsheet application using spreadsheet formula syntax (or language). Moreover, because lambdas are functions which can act like data, the lambda functions enable recursion within a spreadsheet application, e.g., by the function calling itself. In addition to the clear ease of use and functional improvements to spreadsheet applications, native support for the lambda functions can also improve scalability and portability of these spreadsheets that utilize UDFs.

Figure 1A:
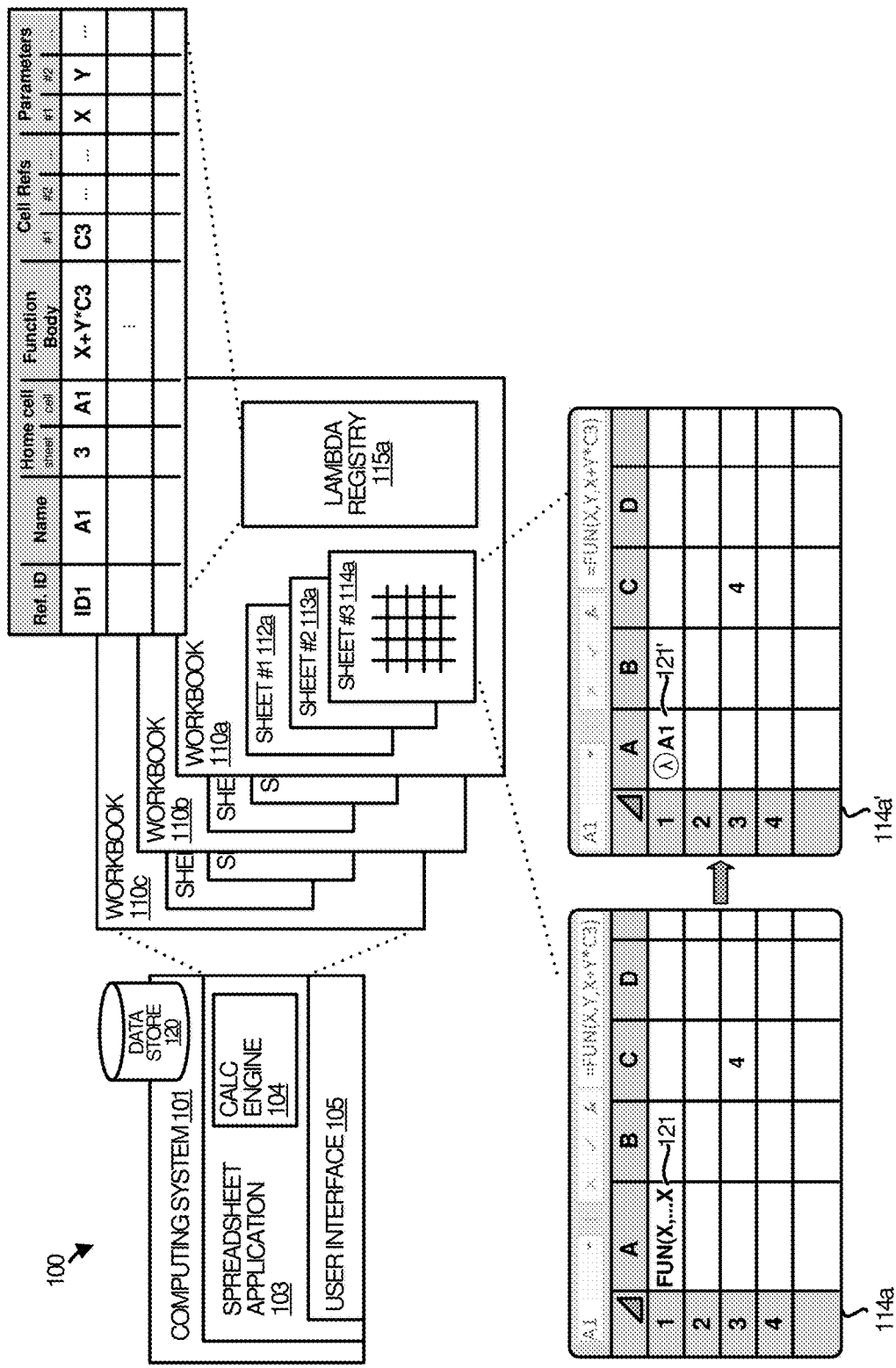
FIGS. 1A and 1B depict block diagrams illustrating an example operational architecture for creating and handling lambda functions in spreadsheet applications, according to some implementations.
Figure 1B:
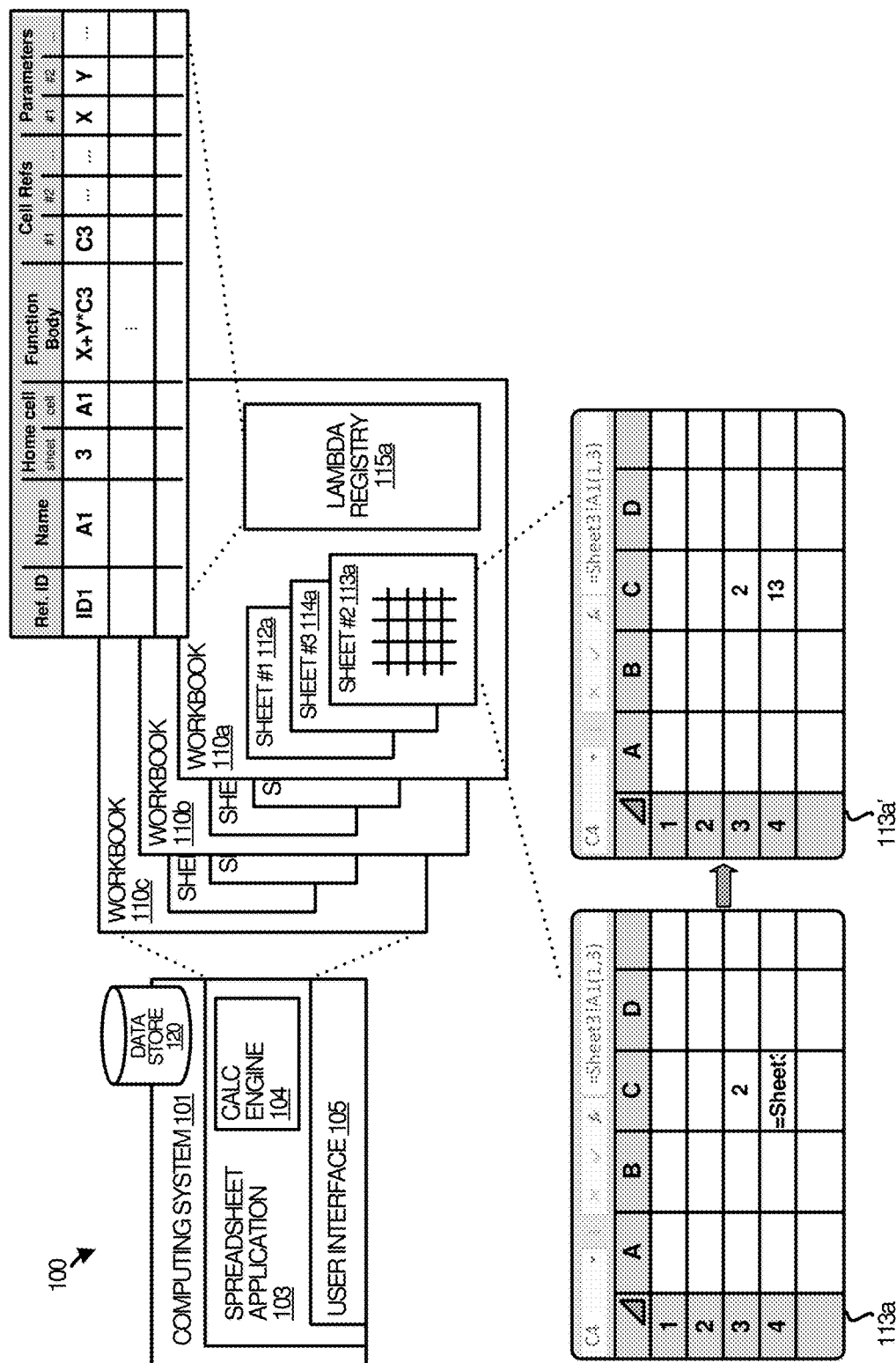

FIGS. 1A and 1B depict a block diagram illustrating an example operational architecture 100 for creating and handling lambda functions in spreadsheet applications, according to some implementations. The operational architecture 100 includes a computing system 101 on which a spreadsheet application 103 may be implemented and a data store 120 on which the spreadsheet application 103 and data contained therein is stored.

Figure 8:
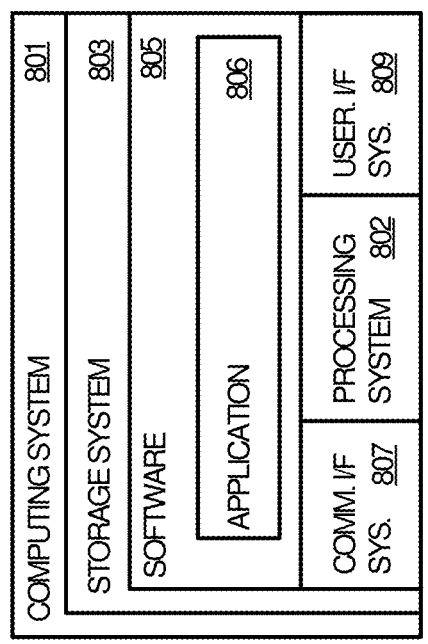
FIG. 8 is a block diagram illustrating a computing system suitable for implementing the technology disclosed herein, including any of the applications, architectures, elements, processes, and operational scenarios and sequences illustrated in the Figures and discussed below in the Technical Disclosure.

The spreadsheet application 103 can include functionality including GUIs (graphical user interface) running on computing system 101, e.g., a PC, mobile phone device, a Web server, or other application servers. Such systems may employ one or more virtual machines, containers, or any other type of virtual computing resource in the context of supporting remote micro-services as native functions within the spreadsheet application 103 of which the computing system 801 of FIG. 8 is representative. The spreadsheet application 103 includes a calculation engine 104 which can assist with driving a user interface 105 to the spreadsheet application 103.

The spreadsheet application 103 can include multiple workbooks, e.g., workbooks 110a-110c. Additional or fewer workbooks are possible. Each workbook can include one or more sheets and a lambda registry. As shown in the example of FIGS. 1A and 1B, workbook 110a includes sheet #1 112a, sheet #2 113a, and sheet #3 114a, and an associated or corresponding lambda registry 115a. Three worksheets are shown for simplicity, each workbook can include additional or fewer sheets. Additionally, while each workbook, e.g., spreadsheet file, is shown as having an associated or corresponding lambda registry, it is appreciated that in some implementations, additional or fewer lambda registries can be utilized. For example, a single registry could be used across multiple workbooks or multiple lambda registries could be associated or corresponding to a single workbook. In some implementations, a registry list is also maintained that identifies workbooks and related or corresponding registries. An example is shown and discussed in greater detail with reference to FIG. 2.

As shown in the examples of FIGS. 1A and 1B, the lambda registry contains various fields including a reference identifier (ID) field, a Name field, a Home Cell field, one or more cell reference fields, and one or more parameter fields. Additional or fewer fields are possible. In some implementations, function syntax, e.g., FUN( ) or FUNCTION( ), is defined in the spreadsheet application which allows users to create and store the lambda functions within a cell of the spreadsheet.

In one example of operation, one or more components of spreadsheet application 103 detect that cell A1 of sheet 114a is populated with an expression that defines a lambda function, e.g., =FUN(X1, . . . Xn, F), where X1-Xn are parameters and F is a function body (or formula) that evaluates into a function value. Although the application primarily discusses inputting an expression via user input, it is appreciated that the expression that defines the lambda function can be input into the cell of the sheet 114a in any number of ways e.g., via user input, programmatic input, etc. The function body F can reference (or refer to) one or more cells of the spreadsheet. As shown in the example of FIG. 1A, the expression 121 defines a lambda function having a body F represented by the formula 'X+Y*C3'.

One or more components of the spreadsheet application can register the lambda function with the lambda registry 115a. The registration includes recording a home cell. The home cell identifies a location of the cell of the spreadsheet where the lambda function is defined. In some implementations, the location indicates a sheet and cell within a workbook. As shown in the example of FIGS. 1A and 1B, the home cell is Sheet #3 114a, cell A1 of workbook 110a.

The lambda registration process can include determining various other names, parameters and/or values and recording those names, parameters and/or values with the lambda registry 115a. For example, the body F represented by the formula 'X+Y*C3' refers to a cell C3. In the example of FIG. 1A, the registration includes recording the cell name and/or location, e.g., cell C3. In some implementations, a direct reference to the cell in the spreadsheet can be recorded. As shown in the example of FIG. 1A, the parameters X and Y can also be recorded in the lambda registry.

Once the lambda function is registered with the lambda registry 115a and stored in cell A1, the rendering of the expression 121 that defines the lambda function can be replaced with a rendering of a reference to the registered lambda function 121'. The rendering, within the cell, can include an indication that the cell contains a lambda function. Various representations (graphical or otherwise) of the registered lambda function are possible. As shown in the example of FIG. 1A, the registered lambda function is represented by a graphical representation of an encircled lambda symbol λ followed by the cell location (or home cell) A1.

Referring next to FIG. 1B, one or more components of spreadsheet application 103 then identify and/or otherwise detect that cell C4 of sheet #2 113a is populated with an expression (or formula) that invokes the lambda function A1( ) from Sheet 3 114a. More specifically, the expression invokes the lambda function Sheet3!A1(1,3), where 1 and 3 are arguments corresponding to parameters X and Y. Responsive to the invocation, the one or more components of spreadsheet application 103 consult the lambda registry 115a to identify the body (or formula) of the lambda function, e.g., F=X+Y*C3, determine a value for cell C3 relative to the home cell, e.g., cell A1 sheet 3, and calculate an output value of the lambda function.

As shown in the example of FIG. 1B, the output value of the lambda function is calculated as follows:

Sheet3!$A1$:=FUN($X,Y,X+Y*C3$)

Sheet3!$C3$:4

Sheet2!$C3$:2

Sheet2!$C4$:=Sheet3!$A1$(1,3)=1+3*Sheet3!$C3$=1+3*4=13

Although not shown in the example of FIGS. 1A and 1B, because lambdas are functions which can act like data, the lambda functions enable recursion within a spreadsheet application, e.g., by the function calling itself. For example, A1:=FUNCTION(x, IF(x<10, A1(x+1), x)) describes a lambda function that will iterate until the value 10 is reached.

Figure 2:
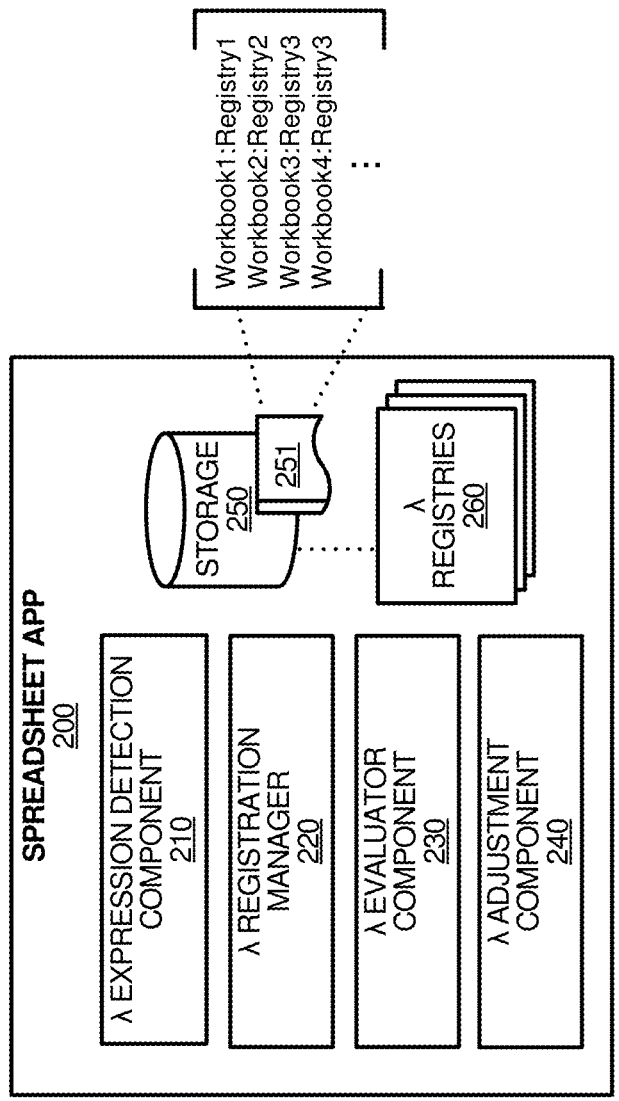
FIG. 2 depicts example components of a spreadsheet application, according to some implementations.

FIG. 2 depicts example components of a spreadsheet application 200, according to some embodiments. The spreadsheet application 200 can be spreadsheet application 103 of FIGS. 1A and 1B, although alternative configurations are possible. The functions represented by the components, modules, managers and/or engines described with reference to FIG. 2 can be implemented individually or in any combination thereof, partially or wholly, in hardware, software, or a combination of hardware and software. Additionally, although illustrated as discrete components, the operation and functionality of the components, modules, managers and/or engines described with reference to FIG. 2 can be integrated anywhere within the spreadsheet application 200 including, but not limited to, the calculation engine 104.

As illustrated in the example of FIG. 2, the spreadsheet application 200 includes a λ expression detection component 210, a λ registration manager 220, a λ evaluator component 230, a λ adjustment component 240, and a storage container 250. Other systems, databases, and/or components are also possible. Various components can also be omitted in some implementations.

The λ expression detection component 210 is configured to detect that a cell of a spreadsheet is populated with an expression that defines a lambda function. As discussed above, in some implementations, function syntax such as, for example, FUN( ) or FUNCTION( ), is defined in the spreadsheet application which allows users to create and store the lambda functions within a cell of the spreadsheet. The λ expression detection component 210 can detect these expressions.

The λ registration manager 220 is configured to register the lambda function with a lambda registry corresponding to the spreadsheet. As discussed herein, each workbook, e.g., spreadsheet file, can include an associated or corresponding lambda registry. In some implementations, a single registry can be used across multiple workbooks or multiple lambda registries could be associated with or correspond to a single workbook. As shown in the example, of FIG. 2, storage container 250 includes a registry list 251 that identifies workbooks and related or corresponding registries. Example registration of a lambda function is shown and discussed in greater detail with reference to FIG. 3.

The λ evaluator 230 is configured to evaluate formulas included in the body of lambda functions when the lambda function is invoked. In some implementations, the 2\, evaluator component 230 calculates an output value of the lambda function using the formula and arguments and stores the output value in the cell from which the lambda was invoked. An example evaluation of a lambda function is shown and discussed in greater detail with reference to FIG. 4.

The λ adjustment component 240 is configured to detect cell adjustment events and responsively access the lambda registry to identify one or more cells referenced by a body of the lambda function that are affected by the cell adjustment event. The λ adjustment component 240 then modifies the one or more cells referenced by the body of the lambda function to account for the adjustment to the one or more cell locations. An example illustrating cell adjustment is shown and discussed in greater detail with reference to FIG. 7.

The storage container 250 includes a registry list 251 and λ registries 260. The storage container 250 can be data store 120 of FIGS. 1A and 1B, although alternative configurations are possible. Likewise, λ registries 260 can be lambda registries 115a-115c of FIGS. 1A and 1B, although alternative configurations are possible.

FIG. 3 depicts flow diagram 300 illustrating example operations for registering a lambda function with a lambda registry of a spreadsheet application, according to some implementations. The example operations may be performed in various implementations by one or more components of a spreadsheet application such as, for example, spreadsheet application 103 of FIGS. 1A and 1B, or one or more processors, extensions, modules, engines, components or tools associated therewith. Alternative configurations are also possible.

To begin, at 301, the spreadsheet application detects that a cell of a spreadsheet is populated with an expression that defines a lambda function. As discussed herein, the expression that defines a lambda function can include explicit syntax such as, for example, FUN( ) or FUNCTION( ). At 303, the spreadsheet application determines a home cell of the lambda function. The home cell identifies a location of the cell of the spreadsheet where the lambda function is defined. In some implementations, the ROW, COLUMN and SHEET functions can be used to collectively determine a cell location.

At 305, the spreadsheet application identifies the function body (or formula) of the lambda function that evaluates into a function value. A lambda function, e.g., =FUN(X1, . . . Xn, F), includes parameters X1-Xn and function body (or formula) F that evaluates into an output value. Various other names, parameters and/or values can also be determined. For example, the function body (or formula) F can refer to one or more cells. The spreadsheet application, at 307, determines the names, locations and/or references to the one or more cells referred to in the formula.

At 309, the spreadsheet application registers the lambda function with a lambda registry corresponding to the spreadsheet. The registration includes recording the home cell that identifies a location of the cell of the spreadsheet where the lambda function is defined. As discussed herein, the location of the cell of the spreadsheet where the lambda function is defined (home cell) can indicate a sheet and cell within a workbook. In some implementations, other names, parameters and/or values are also recorded during the lambda registration. For example, references to cells referred to by the formula can be recorded during the lambda registration.

Lastly, at 311, the spreadsheet application replaces a rendering of the expression that defines the lambda function with a rendering of a reference to the registered lambda function in the cell of the spreadsheet.

FIG. 4 depicts flow diagram 400 illustrating example operations for consulting a lambda registry to identify and calculate an output of a lambda function responsive to invocation of the lambda function, according to some implementations. The example operations may be performed in various implementations by one or more components of a spreadsheet application such as, for example, spreadsheet application 103 of FIGS. 1A and 1B, or one or more processors, extensions, modules, engines, components or tools associated therewith. Alternative configurations are also possible.

To begin, at 401, the spreadsheet application identifies an expression in a cell that invokes the lambda function. As discussed herein, the cell that invokes the lambda function can be in the same or a different spreadsheet than the cell where the lambda function is defined (home cell). In some implementations, the lambda function can be invoked by reference to the home cell or reference to a name of the lambda function.

At 403, the spreadsheet application consults the lambda registry to identify the function body (or formula) of the lambda function. Names, parameters and/or values referred to by the function body (or formula) of the lambda function can also be identified. At 405, the spreadsheet application determines values for the one or more cells referred to by (or included in) the formula. For example, a cell referred to by the function body (or formula) of the lambda function can include, in the lambda registry, a direct reference to the cell in the spreadsheet. The spreadsheet application uses the direct reference to identify the value of the cell prior to evaluating the function body (or formula) of the lambda function.

At 407, the spreadsheet application calculates an output value of the lambda function using the formula and, at 409, replaces a rendering of the expression that invokes the lambda function with a rendering of the output value.

Figure 5B:
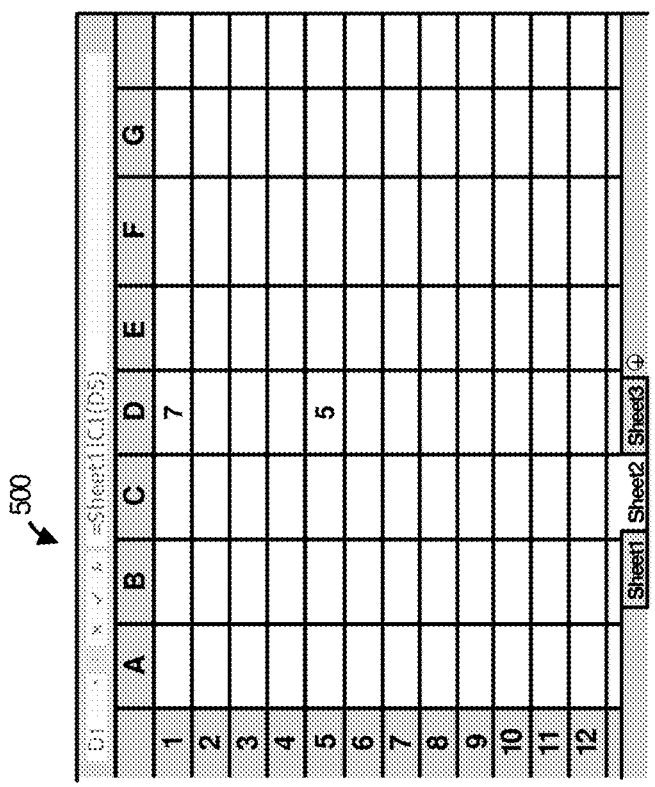
FIGS. 5A and 5B depict various sheets of example workbook illustrating overriding a home cell default using special syntax on an argument that is passed to the lambda function, according to some implementations.
Figure 5A:
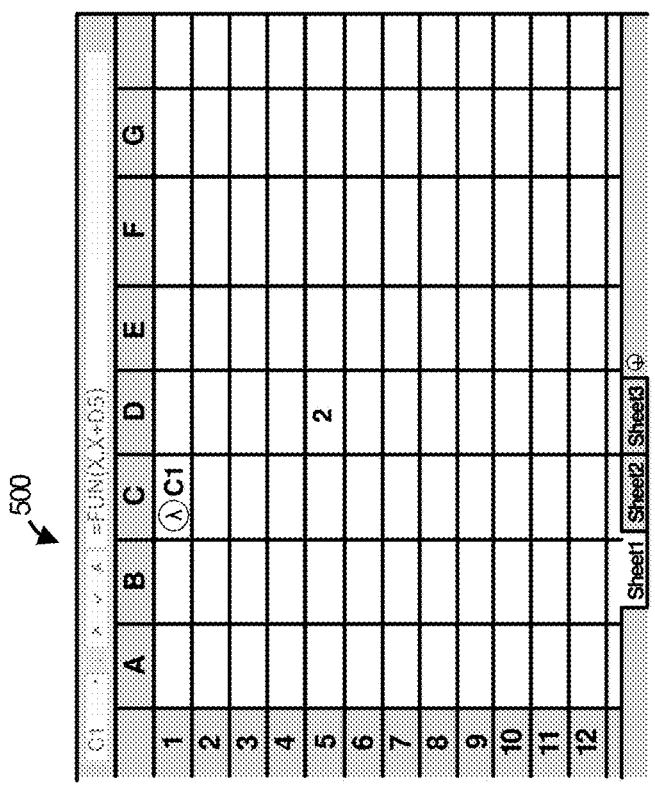

FIGS. 5A and 5B depict various sheets of example workbook 500 illustrating invocation of a lambda function that is defined on another sheet while passing a cell reference as an argument, according to some implementations. More specifically, one or more components of a spreadsheet application such as, for example, spreadsheet application 103 of FIGS. 1A and 1B, identify and/or otherwise detect that cell D1 of sheet 2 is populated with an expression (or formula) that invokes a lambda function 'λC1' which is defined on sheet 1 cell C1 of workbook 500, e.g., the home cell.

The expression invokes the lambda function 'Sheet1!C1( )' with an argument that is cell reference D5. As discussed herein, cells referred to by in body (or formula) of the lambda function are relative to the home cell by default, e.g., Sheet 1, cell C1. However, arguments to a lambda function (if ambiguous) are interpreted relative to the sheet from which the lambda function is invoked (e.g., from the context of the invoker). More specifically, parameters to a function are evaluated before the function is called.

Consequently, responsive to invocation of the lambda function, one or more components of spreadsheet application consult the lambda registry to identify the body (or formula) of the lambda function, e.g., F=X+D5 and calculate an output value of the lambda function. As shown in the example of FIG. 5B, the output value of the lambda function is calculated as follows:

Sheet1!C1:=FUN(X,X+D5)

Sheet1!D5:2

Sheet2!D5:5

Sheet2!D1:=Sheet1!C1(D5)= Sheet1!C1(Sheet2!D5)=Sheet2!D5+ D5=Sheet2!D5+Sheet1!D5=5+2=7

Figure 6A:
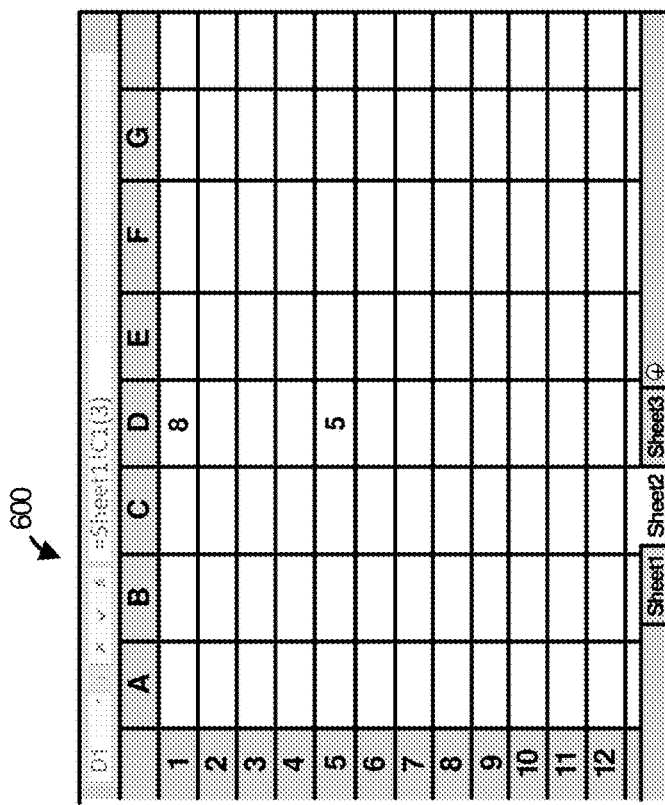
FIGS. 6A and 6B depict various sheets of example workbook illustrating overriding a home cell default using special syntax on cell parameter of the body (or formula) of the lambda function, according to some implementations.
Figure 6B:
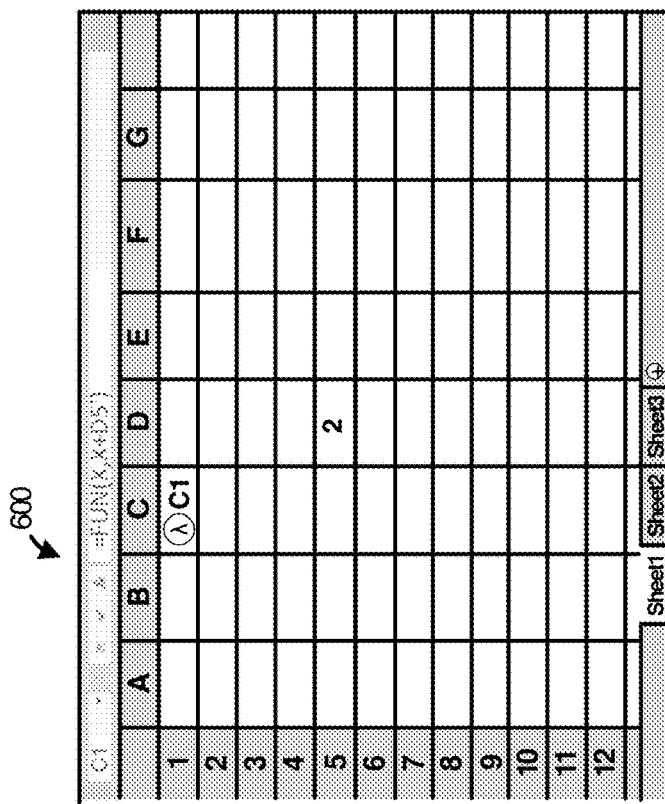

FIGS. 6A and 6B depict various sheets of example workbook 600 illustrating overriding a home cell default using special syntax on cell parameter of the body (or formula) of the lambda function, according to some implementations. More specifically, one or more components of a spreadsheet application such as, for example, spreadsheet application 103 of FIGS. 1A and 1B, identify and/or otherwise detect that cell D1 of sheet 2 is populated with an expression (or formula) that invokes the lambda function 'λC1'.

The expression invokes the lambda function 'Sheet1!C1' with an argument value of '3'. Responsive to the invocation, one or more components of spreadsheet application consult the lambda registry to identify the body (or formula) of the lambda function, e.g., F=X+D5' and first determine a value for cell D5'. The special syntax "'" after the cell reference overrides the relativity of the cell reference from the home cell (e.g., sheet 1 cell C1) to the cell from which the lambda function was invoked (e.g., sheet 2 cell D2).

Consequently, as shown in the example of FIG. 6B, the output value of the lambda function is calculated as follows:

Sheet1!C1: =FUN(X,X+D5')

Sheet1!D5:2

Sheet2!D5:5

Sheet2!D1:=Sheet1!C1(3)=3+D5'=3+Sheet2!D5=3+ 5=8

Figure 7:
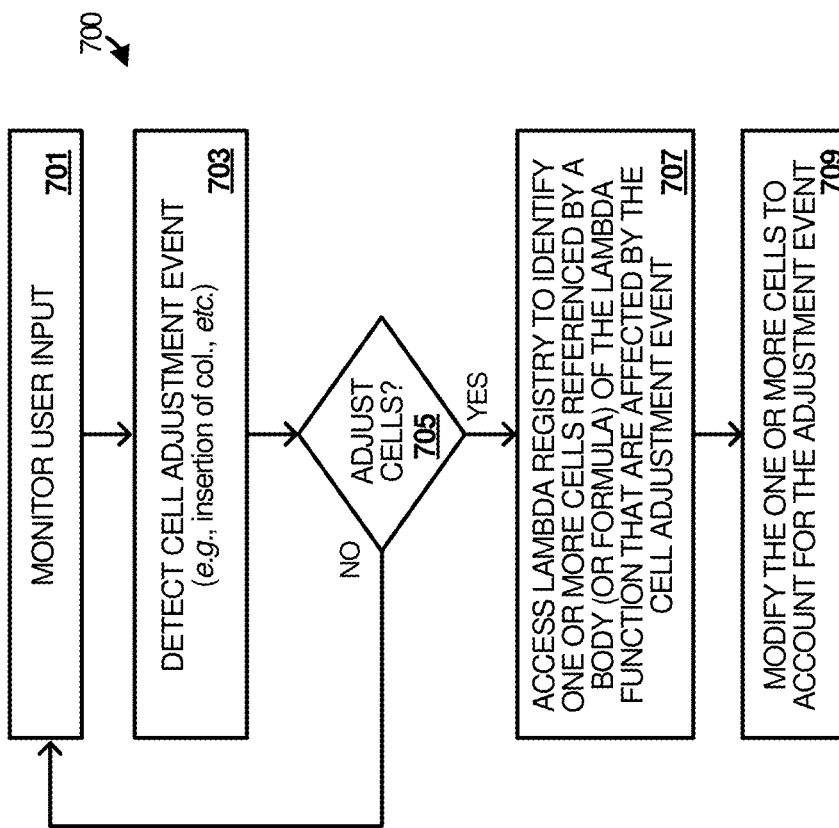
FIG. 7 depicts flow diagram illustrating example operations for consulting a lambda registry to modify a lambda function responsive to a cell adjustment event, according to some implementations.

FIG. 7 depicts flow diagram 700 illustrating example operations for consulting a lambda registry to modify a lambda function responsive to a cell adjustment event, according to some implementations. The example operations may be performed in various implementations by one or more components of a spreadsheet application such as, for example, spreadsheet application 103 of FIGS. 1A and 1B, or one or more processors, extensions, modules, engines, components or tools associated therewith. Alternative configurations are also possible.

To begin, at 701, the spreadsheet application monitors input into spreadsheet application. At 703, the spreadsheet application detects a cell adjustment event. A cell adjustment event can be any event that has an effect on cells that are referenced by a lambda function. At decision 705, the spreadsheet application determines whether there is an adjustment event. If not, the spreadsheet application continues to monitor.

However, if a cell adjustment event is detected, at 707, the spreadsheet application accesses the lambda registry to identify one or more cells referenced by the body (or formula) of the lambda function that are affected by the cell adjustment event. Lastly, at 709, the spreadsheet application modifies the one or more cells referenced by the body of the lambda function to account for the adjustment to the one or more cell locations. For example, if a spreadsheet defines a lambda function that include a body (or formula) A1:=D1 and a user inserts a new column at column C which moves the original cell D1 to E1, the spreadsheet application can automatically adjust the lambda formula to A1:=E1. To make the adjustment, the spreadsheet application needs to find formulas that might need to be adjusted and needs to know the home cells of those formulas. For typical formulas, the spreadsheet application can simply iterate the cells and identify affected formulas.

Finding affected lambda formulas is not as straightforward since lambdas are values and can be stored wherever values can be stored. For example, there is a data type 'Record' in some spreadsheet applications that includes a set of key/value pairs, like Name:Microsoft, CEO:Satya Nadella, etc. The values can also be lambdas or other Records. That is, a cell can contain a Record, which contains another Record, which contains a lambda. If the lambda had the formula:=D1 and with a home cell A1, and the user inserts a new column at column C, then the spreadsheet application will need to adjust the formula accordingly.

Unfortunately, the spreadsheet application cannot iterate through every key/value pair of every Record when performing the adjust function as this would be extremely slow. Moreover, a Third-Party application can provide rich values that include lambdas. In this case, absent a registry, the spreadsheet application is unable to access the lambda. Therefore, the registry of lambda expressions and the corresponding home cells are utilized and the adjust function can iterate over registry and adjust lambda expressions appropriately.

FIG. 8 depicts a computing system 801, which is representative of any system or collection of systems in which the various applications, services, scenarios, and processes disclosed herein may be implemented. Examples of computing system 801 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809 (optional).

Processing system 802 loads and executes software 805 from storage system 803. Software 805 includes various processes, which are generally representative of the processes discussed with respect to the preceding Figures and additional examples below. When executed by processing system 802, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtual machine software, or other application software, in addition to or that include the processes discussed herein. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system for handling approximate values in spreadsheet applications. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The techniques discussed herein can be embodied as special-purpose hardware (e.g., circuitry), as programmable circuitry appropriately programmed with software and/or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiment shown," "in other embodiments," "in some implementations," "according to some implementations," "in the implementation shown," "in other implementations," and the like generally mean the particular feature, structure, or characteristic following the phrase is included in at least one embodiment or implementation of the present technology and may be included in more than one embodiment or implementation. In addition, such phrases do not necessarily refer to the same or different embodiments or implementations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. An apparatus comprising:
one or more computer readable storage media;
program instructions stored on the one or more computer readable storage media including one or more components of a spreadsheet application, wherein the program instructions, when executed by one or more processing systems, direct the one or more processing systems to:
detect that a cell of a spreadsheet is populated with an expression that defines a lambda function;
register the lambda function with a lambda registry corresponding to the spreadsheet,
wherein the registration includes recording a home cell that identifies a location of the cell of the spreadsheet where the lambda function is defined; and
replace a representation of the expression that defines the lambda function with a representation of a reference to the registered lambda function.

2. The apparatus of claim 1, wherein the location of the cell of the spreadsheet where the lambda function is defined indicates a sheet and cell within a workbook.

3. The apparatus of claim 1, wherein the definition of the lambda function includes a body comprising a formula.

4. The apparatus of claim 3, wherein the formula refers to one or more cells, and to register the lambda function with the lambda registry, the instructions, when executed by the one or more processing systems, further direct the one or more processing systems to:
determine and record direct references to the one or more cells referred to by the formula.

5. The apparatus of claim 3, wherein the instructions, when executed by the one or more processing systems, further direct the one or more processing systems to:
identify an expression in a second cell that invokes the lambda function;
consult the lambda registry to identify the body of the lambda function including the formula;
calculate an output value of the lambda function using the formula; and
replace, in the cell of the spreadsheet, a rendering of the expression in the second cell with a rendering of the output value.

6. The apparatus of claim 5, wherein the formula refers to one or more cells, and wherein to calculate the output value of the lambda function using the formula, the instructions, when executed by the one or more processing systems, further direct the one or more processing systems to:
determine values for the one or more cells referred to by the formula.

7. The apparatus of claim 6, wherein at least one cell of the one or more cells referred to by the formula includes syntax indicating that the cell is relative to a cell from which the lambda function is invoked as opposed to the home cell.

8. The apparatus of claim 6, wherein the lambda function is invoked by reference to the home cell or by reference to a name of the lambda function.

9. The apparatus of claim 1, wherein the instructions, when executed by the one or more processing systems, further direct the one or more processing systems to:
detect a cell adjustment event identifying an adjustment to one or more cell locations;
access the lambda registry to identify one or more cells referred to by a body of the lambda function that are affected by the cell adjustment event; and
modify the one or more cells referred to by the body of the lambda function to account for the adjustment to the one or more cell locations.

10. An apparatus comprising:
one or more processing systems;
one or more computer readable storage media storing:
at least one lambda registry data structure; and
program instructions including one or more components of the spreadsheet application, wherein the program instructions, when executed by one or more processing systems, direct the one or more processing systems to:
detect that a cell of a spreadsheet is populated with an expression that defines a lambda function,
wherein the lambda function includes a body identifying a formula for calculating an output value;
determine a home cell that identifies a location of the cell of the spreadsheet where the lambda function is defined; and
register the lambda function, including the home cell, with the lambda registry data structure.

11. The apparatus of claim 10, wherein the program instructions, when executed by the one or more processing systems, further direct the one or more processing systems to:
replace a representation of the expression that defines the lambda function with a representation of a reference to the registered lambda function.

12. The apparatus of claim 10, wherein the location of the cell of the spreadsheet where the lambda function is defined indicates a sheet and cell within a workbook.

13. The apparatus of claim 10, wherein the formula refers to one or more cells, and to register the lambda function with the lambda registry data structure, the instructions, when executed by the one or more processing systems, further direct the one or more processing systems to:
determine and record direct references to the one or more cells referred to by the formula.

14. The apparatus of claim 10, wherein the instructions, when executed by the one or more processing systems, further direct the one or more processing systems to:
identify an expression in a second cell that invokes the lambda function;
consult the lambda registry to identify the body of the lambda function including the formula; and
calculate the output value of the lambda function using the formula.

15. The apparatus of claim 14, wherein the program instructions, when executed by the one or more processing systems, further direct the one or more processing systems to:
replace, in the cell of the spreadsheet, a rendering of the expression in the second cell with a rendering of the output value.

16. The apparatus of claim 10, wherein the program instructions, when executed by the one or more processing systems, further direct the one or more processing systems to:
detect a cell adjustment event identifying an adjustment to one or more cell of the spreadsheet;
access the lambda registry to identify one or more cells referred to by the body of the lambda function that are affected by the cell adjustment event; and
modify the one or more cells referred to by the body of the lambda function to account for the adjustment to the one or more cells.

17. A method comprising:
detecting that a cell of a spreadsheet is populated with an expression that defines a lambda function, wherein the lambda function includes a body identifying a formula for calculating an output value;

determining a home cell that identifies a location of the cell of the spreadsheet where the lambda function is defined;

registering the lambda function with a lambda registry corresponding to the spreadsheet,
wherein the registration includes recording the home cell; and replacing a representation of the expression that defines the lambda function with a representation of a reference to the registered lambda function.

18. The method of claim 17, further comprising:

identifying an expression in a second cell that invokes the lambda function;

consulting the lambda registry to identify the body of the lambda function including the formula; and calculating an output value of the lambda function using the formula.

19. The method of claim 18, further comprising:

replacing a rendering of the expression in the second cell with a rendering of the output value.

20. The method of claim 17, further comprising:

detecting a cell adjustment event identifying an adjustment to one or more cells of the spreadsheet;

accessing the lambda registry to identify one or more cells referred to by the body of the lambda function that are affected by the cell adjustment event; and modifying the one or more cells referred to by the body of the lambda function to account for the adjustment to the one or more cells.

\* \* \* \* \*